(12) United States Patent
Houtchens et al.

(10) Patent No.: US 9,003,513 B1
(45) Date of Patent: Apr. 7, 2015

(54) TRUSTED PLATFORM MODULE COMPLIANCE STATION

(71) Applicant: Google Inc., Mountain View, CA (US)

(72) Inventors: Steven Paul Houtchens, Los Altos, CA (US); Sumit Gwalani, Mountain View, CA (US); Tan Gao, Santa Clara, CA (US); Willis Ransom Calkins, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 103 days.

(21) Appl. No.: 13/829,585

(22) Filed: Mar. 14, 2013

Related U.S. Application Data

(60) Provisional application No. 61/699,751, filed on Sep. 11, 2012.

(51) Int. Cl.
*G06F 1/32* (2006.01)
*H04L 12/26* (2006.01)

(52) U.S. Cl.
CPC .......... *G06F 1/3206* (2013.01); *H04L 12/2602* (2013.01)

(58) Field of Classification Search
CPC .................................................. H04L 12/2602
USPC ........................................................... 726/16
See application file for complete search history.

(56) References Cited

U.S. PATENT DOCUMENTS 6,111,522 A * 8/2000 Hiltz et al. ................. 340/932.2

* cited by examiner

*Primary Examiner* — Jacob Lipman
(74) *Attorney, Agent, or Firm* — McDermott Will & Emery LLP

(57) ABSTRACT

Aspects of the subject technology relate to a compliance station including a test breakout board coupled to a computing device and a trusted platform module, wherein the test breakout board is configured to allow signaling to pass between the computing device and the trusted platform module and a test controller interface coupled to the test breakout board. In certain aspects, the test controller interface is configured to provide signaling to the trusted platform module and to receive signaling from the trusted platform module. A method and computer-readable medium are also provided.

17 Claims, 4 Drawing Sheets

┌─ 200

(202) couple a test breakout board to a computing device and a trusted platform module, wherein the test breakout board is configured to allow signaling to pass between the computing device and the trusted platform module

(204) couple a test controller interface to the test breakout board, wherein the test controller interface is configured to provide signaling to the trusted platform module and to receive signaling from the trusted platform module

(206) monitor, using the test breakout board and the test controller interface, signaling between the trusted platform module and the computing device

FIG. 2

TRUSTED PLATFORM MODULE COMPLIANCE STATION

This application claims the benefit of U.S. Provisional Application No. 61/699,751 filed Sep. 11, 2012, entitled "TRUSTED PLATFORM MODULE COMPLIANCE STATION," which is incorporated herein by reference.

BACKGROUND

The disclosed subject matter provides systems and methods for verifying the functionality of a trusted platform module (TPM) installed in a host computing device.

A TPM (sometimes referred to as a "TPM chip" or "TPM Security Device") is a cryptoprocessor that can be used to store cryptographic keys for protecting information, for example, data stored on a mobile device, such as a notebook or tablet PC. Manufacturers that produce TPMs often test the devices to ensure that they comport with basic functionality standards requirements e.g., the standards set forth by the Trusted Computing Group (TCG).

SUMMARY

The disclosed subject matter relates to a compliance station, comprising, a test breakout board coupled to a computing device and a trusted platform module, wherein the test breakout board is configured to allow signaling to pass between the computing device and the trusted platform module and a test controller interface coupled to the test breakout board, wherein the test controller interface is configured to provide signaling to the trusted platform module and to receive signaling from the trusted platform module.

The disclosed subject matter also relates to a method for verifying compliance requirements of a trusted platform module, comprising, coupling a test breakout board to a computing device and a trusted platform module, wherein the test breakout board is configured to allow signaling to pass between the computing device and the trusted platform module and coupling a test controller interface to the test breakout board, wherein the test controller interface is configured to provide signaling to the trusted platform module and to receive signaling from the trusted platform module and wherein the test breakout board and the test controller interface are configured to monitor signaling between the trusted platform module and the computing device.

In yet another aspect, the disclosed subject matter also relates to a computer-readable medium comprising instructions stored therein, which when executed by a processor, cause the processor to perform operations comprising, facilitating, using a test breakout board, communication between a computing device and a trusted platform module, providing signaling to the trusted platform module, using a test controller interface and receiving signaling from the trusted platform module, using the test controller interface. In some aspects, the processors can be further configured to perform steps for monitoring signaling between the trusted platform module and the computing device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIG. 2 illustrates a flow diagram of an example method for verifying compliance requirements of a TPM, according to certain aspects of the disclosure.

DETAILED DESCRIPTION

Figure 1:
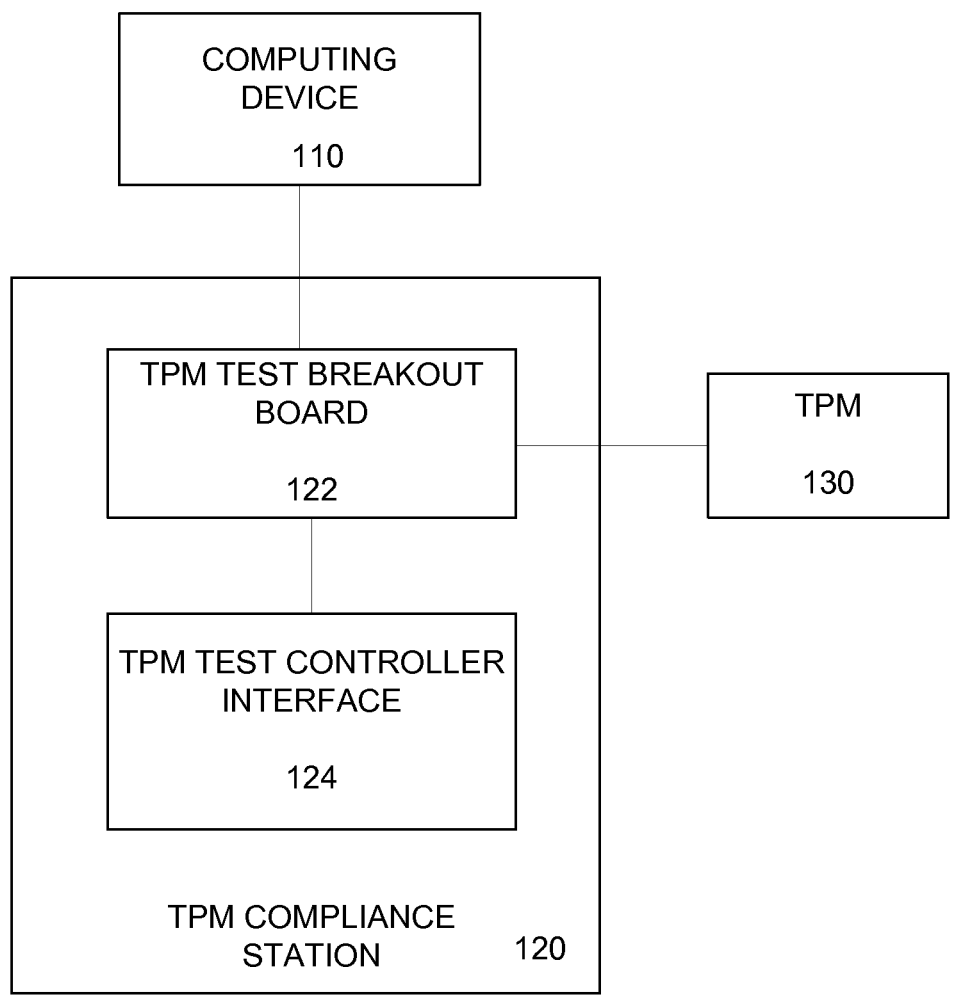
FIG. 1 illustrates a block diagram of a system including a trusted platform module compliance station, according to some aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Although some basic TPM functionality requirements are dictated by standards specifications (e.g., TCG standards), testing performed by manufacturers is often done without knowledge of the type of computing platform on which the TPM is to be implemented. Thus, to ensure standards compliance, many TPM manufacturers test basic TPM functionality before installation into a host computing device. However, such tests are usually limited to verification of basic TPM operations and are performed without the benefit of connectivity to the host device in which the TPM is to be installed. As a result, conventional TPM tests do not verify platform specific functionality or performance characteristics.

Although most TPMs perform some of the same basic functions, design differences between manufacturers will often result in performance disparities. Additionally, actual TPM use and performance can vary widely depending on the needs and behavior of the computing system in which the TPM is implemented, as such, there exists a need to perform TPM testing across TPMs made by different manufacturers in the context of actual TPM implementation e.g., relative to use with a specific computing device/platform.

The subject disclosure provides a system and method for testing/verifying TPM characteristics in a context similar to that in which the TPM is to be implemented. Aspects of the subject technology can include hardware embodiments that "wrap around" the TPM for facilitating communication between the TPM and the host computing device. The subject technology can also include hardware and software for use in providing signaling to (and receiving signaling from) a TPM device communicatively coupled a host computing system or platform (e.g., via a TPM breakout board), as described in further detail below.

In some implementations, the subject technology can include a TPM compliance station (TCS) that comprises a TPM Test Breakout Board (TTBB) and a TPM Test Controller Interface (TTCI). The TTBB can facilitate coupling between the TPM and the host computing device, whereas the TTCI can facilitate the injection (or reception) of signaling to (or from) the TPM, e.g., via the TTBB. In some implementations, the TCS (using the TTBB and/or the TTCI) can be used to test and/or verify various aspects of TPM functionality. For example, the TCS may be used to verify 1) functionality of the TPM through suspend/resume cycles; 2) the speed at which the TPM generates/regenerates cryptographic keys; and/or 3) power consumption characteristics of the TPM, for example, as the computing device transitions between different power/computing states.

FIG. 1 illustrates a block diagram of a system 100 including trusted platform module compliance station (TCS) 120. As illustrated, TCS 120 includes TPM test breakout board 122 and TPM test controller interface 124. The TCS 120 is coupled to computing device 110 and TPM 130.

The TPM 130 can be coupled to computing device 110 via TCS 120 e.g., via TPM breakout board 122. In some implementations, TPM 130 can send and receive signals to/from computing device 110, via TPM breakout board 122, such that, TPM 130 and computing device 100 may communicate in a manner resembling a configuration in which TPM 130 is coupled directly to computing device 110.

In certain aspects, TCS 120 can be configured to measure/detect signaling between computing device 110 and TPM 130 and to provide signaling to TPM 130 and/or computing device 110 e.g., from an external source. TPM test controller interface 124 can provide signaling to TPM 130, for example, from an external source (not shown), in order to mimic states or behavior of computing device 110.

By providing an interface between computing device 110 and TPM 130, TCS 120 can be used to monitor and/or test TPM 130 against different computing states of computing device 110. Compliance station 120 can also be used to test functionality of TPM 130, for example, by providing input to (and receiving output from) TPM 130, via TPM test controller interface 124.

In some implementations, TCS 120 can be configured to measure the behavior of TPM 130 throughout changes in the computing states of computing device 110. For example, signaling and power consumption characteristics of TPM 130 can be measured using TCS 120 when computing device 110 is in a powered 'on' or 'ready' state. Similarly, signaling and power consumption characteristics of TPM 130 can be monitored as computing device 110 transitions into other power states, for example, into a suspend state or into a powered 'off' state. By monitoring power consumption and behavior characteristics of TPM 130 as computing device 110 cycles through various power states, TCS 120 can be used to verify functional requirements and/or device characteristics of TPM 130.

By way of example, TPM 130 can be configured to receive power and to remain in a low power state, even as the computing device is powered 'off,' e.g., for the purpose of decreasing the time required to reboot or resume a user computing session. As such, the ability to monitor TPM power usage and functional characteristics using TCS 120 (e.g., even when computing device 110 is powered off), enables functionality of TPM 130 to be verified as computing device 110 is placed in different power states.

In some implementations, TCS 120 can be used to determine a number of keys (e.g., cryptographic keys) that are stored by TPM 130 and/or to measure a rate at which one or more keys and/or random numbers can be generated or regenerated by TPM 130. In certain aspects, TPM test controller interface 124 can be used to provide signals to TPM 130, via TPM test breakout board 122, e.g., that mimic signals TPM 130 could receive from computing device 110. In some examples, the signals provided via TPM test controller interface 124 may be used to indicate that TPM 130 needs to generate/re-generate one or more keys. As such, TCS 120 can be used to measure a time delay of TPM 130 for generating/regenerating one or more keys.

In another implementation, TCS 120 can be used to measure power consumption characteristics of TPM 130, with respect to various computing states. By way of example, TCS 120 can be used to measure power consumption of TPM 130 as computing device 110 is powered 'on,' powered 'off' and/or placed in a 'suspend' or 'hibernate' state.

In certain aspects TCS 120 can be configured to test user specific functionality (i.e. "ownership") of TPM 130, for example, to verify the existence (or restriction) of certain TPM functionality for one or more users of computing device 110. TCS 120 can also be configured to test TPM 130 against "fuzzing" (e.g., the delivery of random or garbage data), for example, to determine how TPM 130 responds to incoherent inputs.

Additionally, in some implementations, TCS 120 can be configured to test the aforementioned aspects with respect to multiple TPM devices. For example, TCS 120 may be configured to simultaneously verify and/or test various aspects of TPM functionality for a particular TPM against one or more other TPM devices. In this manner, TPM functionality can be compared, for example, across various TPM manufacturers, hardware and/or software versions and/or amongst multiple similar devices.

FIG. 2 illustrates a flow diagram of steps of a method 200, for implementing some aspects of the subject technology. Method 200 begins with step 202 in which a test breakout board is coupled to a computing device and to a trusted platform module, wherein the test breakout board is configured to allow signaling to pass between the computing device and the trusted platform module.

The test breakout board may include various hardware and/or software components necessary to interface with a trusted platform module (TPM) and to allow signaling to pass between the TPM and the computing device (e.g., the host computing device).

In step 204, a test controller interface is coupled to the test breakout board, wherein the test controller interface is configured to provide signaling to the TPM and to receive signaling from the TPM. The test controller interface may also include various hardware and/or software components necessary to receive signaling from the TPM (e.g., to receive signaling sent between the TPM and the computing device).

In some implementations, the test controller interface is configured to receive signaling (e.g., from an external source) and to provide the received signaling to the TPM via the test breakout board. For example, the test controller interface can be used to provide signaling to the TPM to mimic or imitate signaling that could be received from the computing device. As such, the test controller interface may be used to perform tests or to measure TPM characteristics by simulating interactions that can take place between the TPM and the computing device.

In step 206, the test breakout board and the test controller interface can monitor signaling between the trusted platform module and the computing device. In certain implementations, the test breakout board and test controller interface can be used to verify various functional states of the TPM and/or may be used to measure device characteristics or properties of the TPM. For example, the test controller interface and/or test breakout board can be used to verify proper functionality of the TPM as the computing device transitions through different power states, for example, between suspend/resume cycles and power 'on' and 'off' states.

In certain aspects, the test controller interface and/or test breakout board can be used to measure characteristics of the TPM with respect to the creation and storage of one or more cryptographic keys. For example, the test controller interface and/or test breakout board can be used to measure the speed in which the TPM can generate and/or regenerate one or more cryptographic keys. Similarly, the test controller interface and/or test breakout board can be used to verify a default number of keys that are generated/stored by the TPM.

In certain aspects, the test controller interface and/or test breakout board can be used to measure power consumption characteristics of the TPM. For example, the test controller interface and/or test breakout board can be used to measure the power rate consumption of the TPM when the computing device is powered on, as well as when the computing device is powered off, or as the computing device transitions between various power states.

Figure 3:
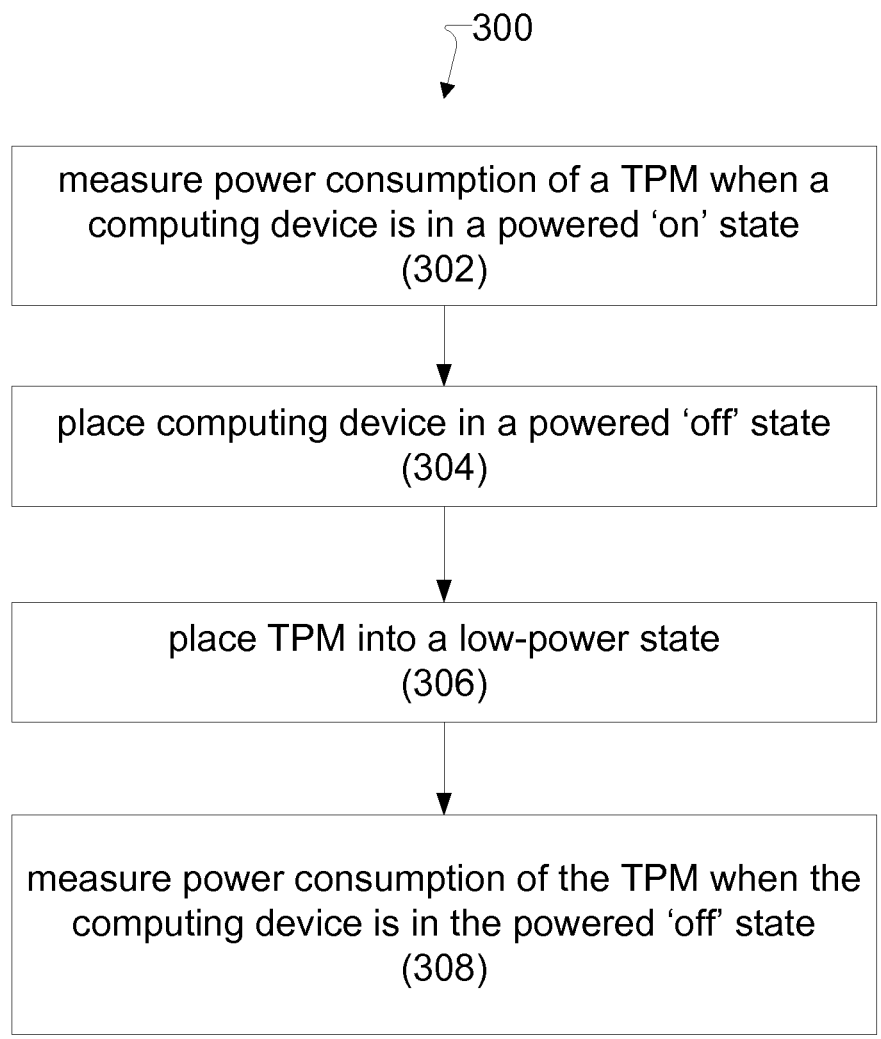
FIG. 3 illustrates a flow diagram of an example method for monitoring power consumption of a TPM, according to certain aspects of the disclosure.

FIG. 3 illustrates a flow diagram of an example method 300 for monitoring power consumption of a trusted platform module, according to some aspects of the disclosure. The method 300 begins with step 302 in which power consumption of a TPM is measured when the computing device is in a powered 'on' state.

In step 304, the computing device is transitioned from an 'on' state, into an 'off' state. Subsequently, in step 306, the TPM is placed into a low-power state. In some implementations, the TPM can remain in a low power state when the computing device is powered off (e.g., by drawing current from a battery of the computing device). By having a small amount of power constantly delivered to the TPM, the device can quickly recover or 'boot up' a computing session, for example, when a user turns the computing device 'on.'

Although several of the forgoing functional tests are described with respect to a TPM device, it should be understood that aspects of the subject technology could be implemented with other types of hardware components. For example, the compliance station described herein could be configured to verify and/or test functionality of other types of chips and/or devices configured for installation in, or use with, electronic devices, such as computing device 110, as discussed above.

Figure 4:
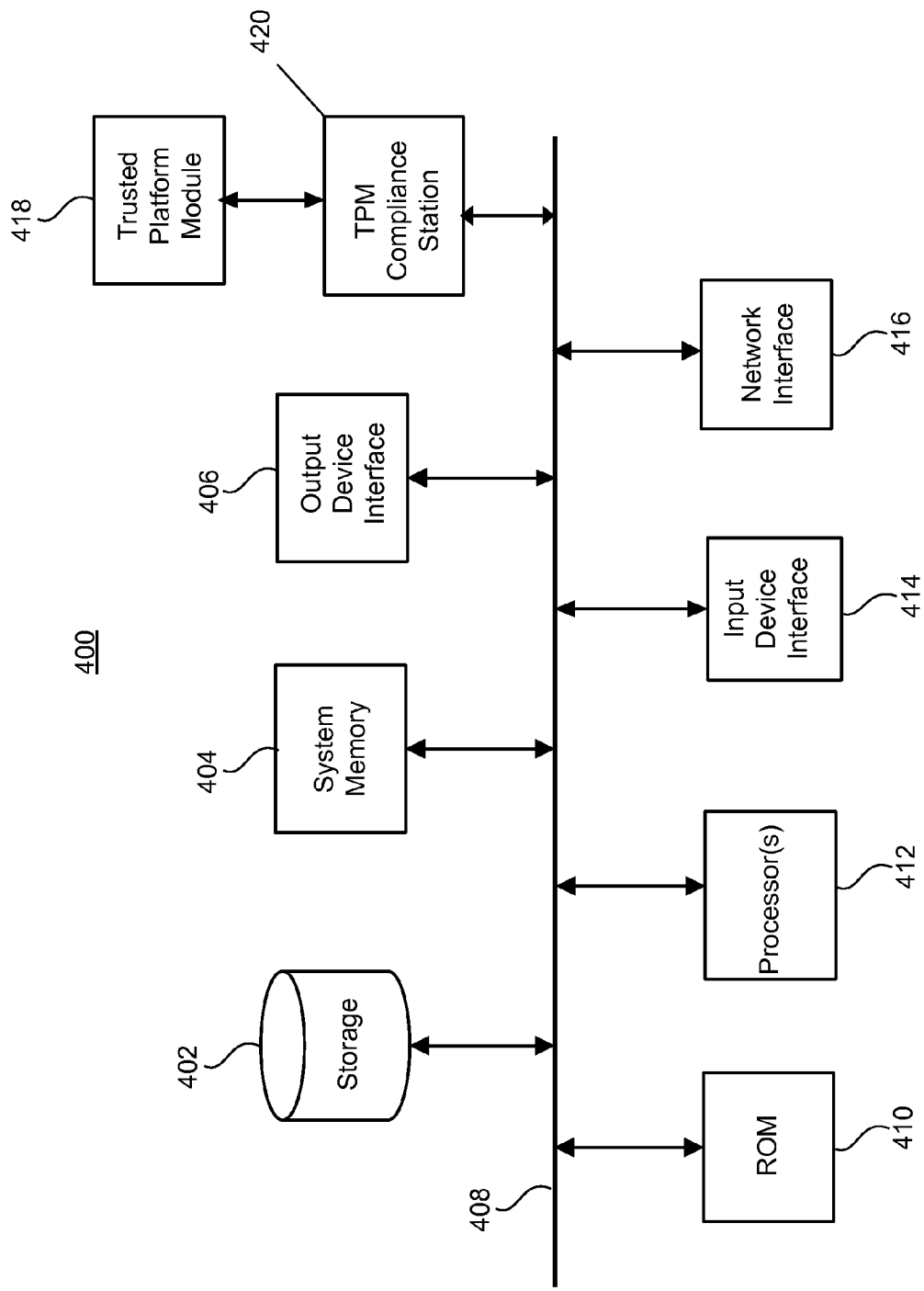
FIG. 4 illustrates an example of a system for carrying out some aspects of the subject disclosure.

FIG. 4 illustrates an example of an electronic system 400 that can be used for implementing certain aspects of the subject disclosure. Although electronic system 400 can comprise any processor based device, in some examples electronic system 400 may be a computing device such as a notebook, or tablet PC.

As illustrated, electronic system 400 includes storage 402, system memory 404, output device interface 406, system bus 408, ROM 510, processor(s) 412, input device interface 414 and network interface 416. Electronic system 400 further comprises trusted platform module 418 and TPM compliance station 420, wherein trusted platform module 418 is communicatively coupled to electronic system 400 (e.g., by bus 408) via TPM compliance station 420.

In some aspects, system bus 408 collectively represents all system, peripheral, and chipset buses that communicatively connect the numerous internal devices of electronic system 400. For instance, system bus 408 communicatively connects processor(s) 412 with ROM 410, system memory 404, output device interface 406 and permanent storage device 402. System bus 408 can comprise either a serial bus or a parallel bus that can be implemented using various types of computer architecture and/or different communication protocols. By way of example, system bus 408 could be a low pin count (LPC) bus, a L2C bus, a serial peripheral interface bus (SPI), etc.

In some implementations, the various memory units, processor(s) 412 retrieve instructions to execute (and data to process) in order to execute the steps of the subject technology. Processor(s) 412 can be a single processor or a multi-core processor in different implementations. Additionally, the processor(s) 412 can comprise one or more graphics processing units (GPUs) and/or one or more decoders, depending on implementation.

ROM 410 stores static data and instructions that are needed by processor(s) 412 and other modules of electronic system 400. Similarly, processor(s) 412 can comprise one or more memory locations such as a CPU cache or processor in memory (PIM), etc. Storage device 402, is a read-and-write memory device. In some aspects, this device can be a non-volatile memory unit that stores instructions and data even when electronic system 400 is without power. Some implementations of the subject disclosure can use a mass-storage device, such as solid state, magnetic or optical storage devices, e.g., permanent storage device 402.

Other implementations can use one or more a removable storage devices (e.g., magnetic or solid state drives) such as permanent storage device 402. Although the system memory can be either volatile or non-volatile, in some examples system memory 404 is a volatile read-and-write memory, such as a random access memory. System memory 404 can store some of the instructions and data that the processor needs at runtime.

In some implementations, TPM compliance station 420 may include hardware (such as memory) and/or software used to implement some aspects of the subject disclosure. For example, the TPM compliance station 420 may include a TPM test breakout board and a TPM test controller interface, as described above with respect to FIG. 1.

Additionally, TPM compliance station 420 may be configured for remote use/testing. For example, using network interface 416, TPM compliance station 420 may be configured to perform TPM testing with respect to one or more TPMs under the direction of a remote user (e.g. via a network).

In some implementations, the processes of the subject disclosure are stored in system memory 404, permanent storage device 402, ROM 410 and/or one or more memory locations embedded with the processor(s) 412. From these various memory units, processor(s) 412 retrieve instructions to execute and data to process in order to execute some implementations of the instant disclosure.

Bus 408 also connects to input device interface 414 and output device interface 406. Input device interface 414 enables a user to communicate information and select commands to electronic system 400. Input devices used with input device interface 414 may include for example, alphanumeric keyboards and pointing devices (also called "cursor control devices") and/or wireless devices such as wireless keyboards, wireless pointing devices, etc.

In practice, the methods of the subject technology can be carried out by electronic system 400. In some aspects, instructions for performing one or more of the method steps of the present disclosure are stored on one or more memory devices such as storage 402 and/or system memory 404.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed:
1. A compliance station, comprising:
a test breakout board coupled to a computing device and a trusted platform module, wherein the test breakout board is configured to allow signaling to pass between the computing device and the trusted platform module; and a test controller interface coupled to the test breakout board, wherein the test controller interface is configured to provide signaling to the trusted platform module and to receive signaling from the trusted platform module, and wherein the test breakout board and the test controller interface are configured to measure a rate at which the trusted platform module can generate one or more cryptographic keys.

2. The compliance station of claim 1, wherein the test breakout board and the test controller interface are configured to monitor electrical properties of the trusted platform module as the computing device transitions between a suspend power state and a resume power state.

3. The compliance station of claim 1, wherein the test breakout board and the test controller interface are configured to facilitate a measurement of trusted platform module power consumption when the computing device is placed in a suspend power state.

4. The compliance station of claim 1, wherein the test breakout board and the test controller interface are configured to facilitate a measurement of trusted platform module power consumption when the computing device is powered off.

5. The compliance station of claim 1, wherein the test breakout board and the test controller interface are configured to facilitate a measurement of trusted platform module power consumption when the computing device is powered on.

6. The compliance station of claim 1, wherein the test breakout board and the test controller interface are configured to determine a number of keys that have been pre-generated by the test controller interface.

7. The compliance station of claim 1, wherein the trusted platform module is configured to enter a low power state when the computing device is powered off.

8. A method for verifying compliance requirements of a trusted platform module, comprising:

coupling a test breakout board to a computing device and a trusted platform module, wherein the test breakout board is configured to allow signaling to pass between the computing device and the trusted platform module; and coupling a test controller interface to the test breakout board, wherein the test controller interface is configured to provide signaling to the trusted platform module and to receive signaling from the trusted platform module, wherein the test breakout board and the test controller interface are configured to monitor signaling between the trusted platform module and the computing device, and wherein the test breakout board and the test controller interface are configured to determine a number of cryptographic keys that have been pre-generated by the trusted platform module.

9. The method of claim 8, wherein the test breakout board and the test controller interface are configured to facilitate a measurement of trusted platform module power consumption when the computing device is placed in a suspend power state.

10. The method of claim 8, wherein the test breakout board and the test controller interface are configured to facilitate a measurement of trusted platform module power consumption when the computing device is powered off.

11. The method of claim 8, wherein the test breakout board and the test controller interface are configured to facilitate a measurement of power consumption of the trusted platform module when the computing device is powered on.

12. The method of claim 8, wherein the test breakout board and the test controller interface are configured to measure a rate at which the trusted platform module can generate one or more cryptographic keys.

13. The method of claim 8, wherein the trusted platform module is configured to enter a low power state when the computing device is powered off.

14. A computer-readable medium comprising instructions stored therein, which when executed by a processor, cause the processor to perform operations comprising:

facilitating, using a test breakout board, communication between a computing device and a trusted platform module;

providing signaling to the trusted platform module, using a test controller interface;

receiving signaling from the trusted platform module, using the test controller interface; and monitoring signaling between the trusted platform module and the computing device, the monitoring comprising measuring a rate at which the trusted platform module can generate or re-generate one or more cryptographic keys.

15. The computer-readable medium of claim 14, monitoring signaling between the trusted platform module and the computing device further comprises:

measuring power consumption of the trusted platform module when the computing device is placed in a suspend power state.

16. The computer-readable medium of claim 14, monitoring signaling between the trusted platform module and the computing device further comprises:

measuring power consumption of the trusted platform module when the computing device is in a power off state.

17. The computer-readable medium of claim 14, wherein monitoring signaling between the trusted platform module and the computing device further comprises:

monitoring behavior of the trusted platform module as the computing device transitions between a power on state and a suspend power state.

\* \* \* \* \*